United States Patent [19]
Greer

[11] Patent Number: 5,370,154
[45] Date of Patent: Dec. 6, 1994

[54] ROTARY CONTROL VALVE WITH VARIABLE AREA ORIFICE

[75] Inventor: Cecil B. Greer, White Oaks, Tex.

[73] Assignee: Robert L. Cargill, Jr., Longview, Tex.

[21] Appl. No.: 191,602

[22] Filed: Feb. 4, 1994

Related U.S. Application Data

[63] Continuation-in-part of Ser. No. 947,713, Sep. 18, 1992, Pat. No. 5,311,897.

[51] Int. Cl.$^5$ ............................................. F16K 5/10
[52] U.S. Cl. .................. 137/625.32; 251/209; 251/367
[58] Field of Search .............. 251/367, 208, 209, 117; 137/15, 315, 625.31, 625.32, 625.33, 599, 601

[56] References Cited

U.S. PATENT DOCUMENTS

| | | | |
|---|---|---|---|
| 3,443,793 | 5/1969 | Hulsey | 251/209 |
| 3,558,100 | 1/1971 | Hulsey | 251/209 |
| 3,612,102 | 10/1971 | Hulsey | 251/209 |
| 4,212,321 | 7/1980 | Hulsey | 251/209 |
| 4,881,718 | 11/1989 | Champagne | 251/209 |

Primary Examiner—A. Michael Chambers
Attorney, Agent, or Firm—Gunn & Kuffner

[57] ABSTRACT

A rotary control valve with a variable area orifice (or orifices) which communicate with a bypass channel in order to provide infinite control of flow across the valve. The bypass channel may contain a silencing means. This arrangement allows for in-line maintenance of, or modification to, either the silencing means or the valve body itself through top entry of the valve. The cross-sectional void area of the bypass channel may be sized to be the same as the cross-sectional area of the upstream and downstream valve ports in order to provide silencing without throttling the flow through the valve.

28 Claims, 5 Drawing Sheets

ROTARY CONTROL VALVE WITH VARIABLE AREA ORIFICE

The present application is a continuation-in-part of application Ser. No. 07/947,713 filed Sep. 18, 1992, now U.S. Pat. No. 5,311,897 issued May 17, 1994.

BACKGROUND OF THE DISCLOSURE

The present invention relates to a rotary control valve with a variable area orifice that communicates with a bypass channel. This arrangement effectively eliminates cavitation and noise in the valve in any intermediate position. More specifically, the invention relates to a rotary control valve with a variable area orifice in the control element that communicates with a bypass channel in any intermediate or modulated position. Variable area rotary control valves are widely used in the petroleum refining and chemical industries. Several types of these valves with rotary control elements have been disclosed including the following U.S. Pat. Nos. 3,443,793, 3,558,100, 3,612,102, and 4,212,321.

The present invention may be described as an improvement over the known valves that control flow velocity and pressure drop of fluids through various connected flow conduits. The current technology uses rotary valves, which, when rotated through predetermined angular rotation, provide a controlled variation of the flow path from the fully open position to the shut position. The full open position provides maximum flow with variable flow decreasing to the completely shut position.

In addition to controlling the flow characteristics (i.e., velocity and pressure), the rotary valves currently used often contain a noise reduction means to suppress the noise inherently created by the restriction of the high velocity flow of fluids through a rotary control valve. These noise suppression means are primarily diverters of the fluid flow through a labyrinth of multiple pathways forming a tortuous path that creates a restricted flow coupled with a dissipation of energy, resulting in substantially reduced noise levels.

The '321 patent provides means to vary a flow path using two opposed divergent spiral grooves, one of which is in register with the upstream port and the other of which is in register with the downstream port. When the spiral grooves are rotated in the flow path, flow is diverted into a tortuous path thereby creating a controlled restriction of flow and resultant noise suppression. When the valve in the '321 patent is open, the valve provides an unrestricted flow path. The '321 patent also describes a valve in which noise is further reduced by placing other noise silencing means within the flow valve element of the valve as well as within the two opposed divergent spiral grooves.

The noise suppression of the '321 patent presents several difficulties. Primarily, the noise suppression means are subject to wear, erosion, and clogging. Valves employing these flow control and noise suppression means require substantial, periodic maintenance. Maintenance often times requires replacement of the control member or the noise silencing means. At a minimum, because the design of the rotary valves described in the prior art precludes the design of a top entry valve body, maintenance to such a valve requires that the valve be completely removed from the line, disassembled, retrimmed and then reinstalled at considerable expense with interruption of the line.

SUMMARY OF THE INVENTION

This disclosure sets out a variable area orifice rotary control valve improved by placing one or two parallel variable area orifices above and/or below the equator of the valve element which then communicate with a bypass channel. The valve member is rotatable within the valve housing. In the fully open position, the valve element provides unrestricted flow through the bypass channel. Ordinarily, the bypass channel flow way cross sectional area is effectively the same cross sectional area as the ports in order to avoid constriction in the valve while open. Two circular seals, which fit into the valve body, are placed upstream and downstream to further provide an adequate sealing means between the valve housing and the control valve element. When the valve is in the fully open position, the bypass channel communicates the maximum flow from the upstream port to the downstream port. When the control valve element is rotated from the fully open position, the variable area orifices connect the bypass channel with the variable flow which depends on the position of the control valve element. To maximize the noise suppression and flow control function of the bypass channel, the cross sectional area in the channel is the same as the cross sectional area of the upstream and downstream ports.

It is an object of this invention to provide a variable area orifice with a high range of flow rates. One advantage of this wide range of flow control is that it allows one valve to handle a wider range of applications. For example, a single six inch rotary valve of the preferred embodiment described below can be used to control the same flow range that would otherwise require a six inch conventional control valve in parallel with a four inch control valve. Any dual valve installation requires complicated control arrangements, e.g., a split range transmitter arrangement for control or a manual selector of one valve or the other depending on the desired flow range.

It is an object of this invention to provide a tortuous path (which may have additional noise suppression means and flow control means) that can be removed and replaced without removing the valve from service or disassembling the valve from the pipeline.

It is an object of this invention to minimize the pressure drop through the valve when in the fully open position while minimizing the pressure drop, noise, and cavitation problems associated with conventional rotary control valves in modulated or intermediate open positions. This object is further enhanced by providing a cross sectional area in the bypass channel that is the same as the cross sectional area of the upstream and downstream ports. Pressure drop across the valve is minimized in the full open position because the channel (or the through bore when only one stream slot is used) is fully sized and the flow is completely directed into the tortuous path.

It is an object of this invention to provide defusers within the tortuous path to control velocities within reasonable limits and thereby distribute the pressure drop in stages and avoid a single pressure drop across the valve.

It is an object of this invention to, in some instances, fully eliminate the through bore of a typical rotary control valve, thereby achieving lower overall cost of fabricating and maintaining the valve.

BRIEF DESCRIPTION OF THE DRAWINGS

So that the manner in which the above recited features, advantages and objects of the present invention are attained and can be understood in detail, a more particular description of the invention, briefly summarized above may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
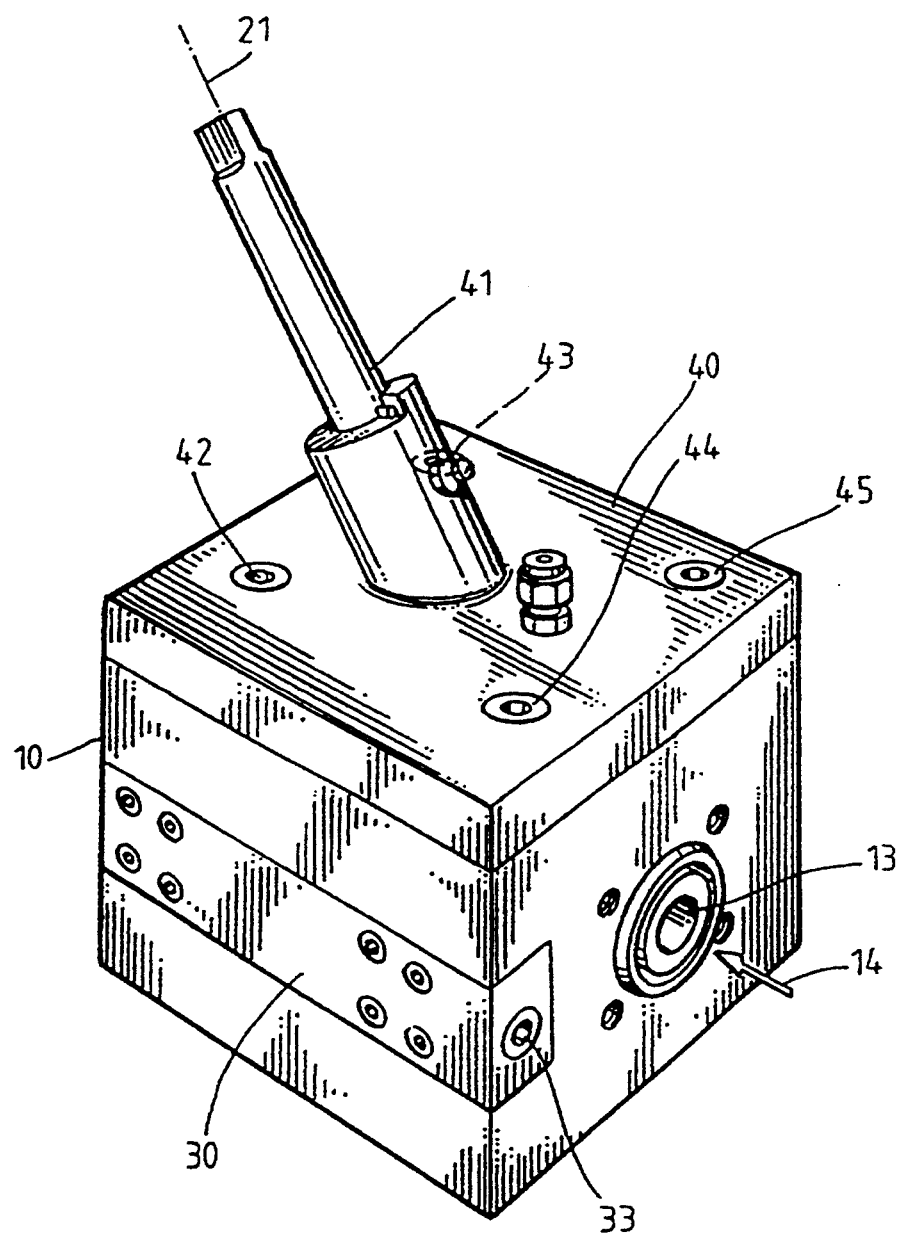
FIG. 1 is a view of one embodiment of the rotary control valve with offset variable area orifices (or slots) and bypass.
Figure 2:
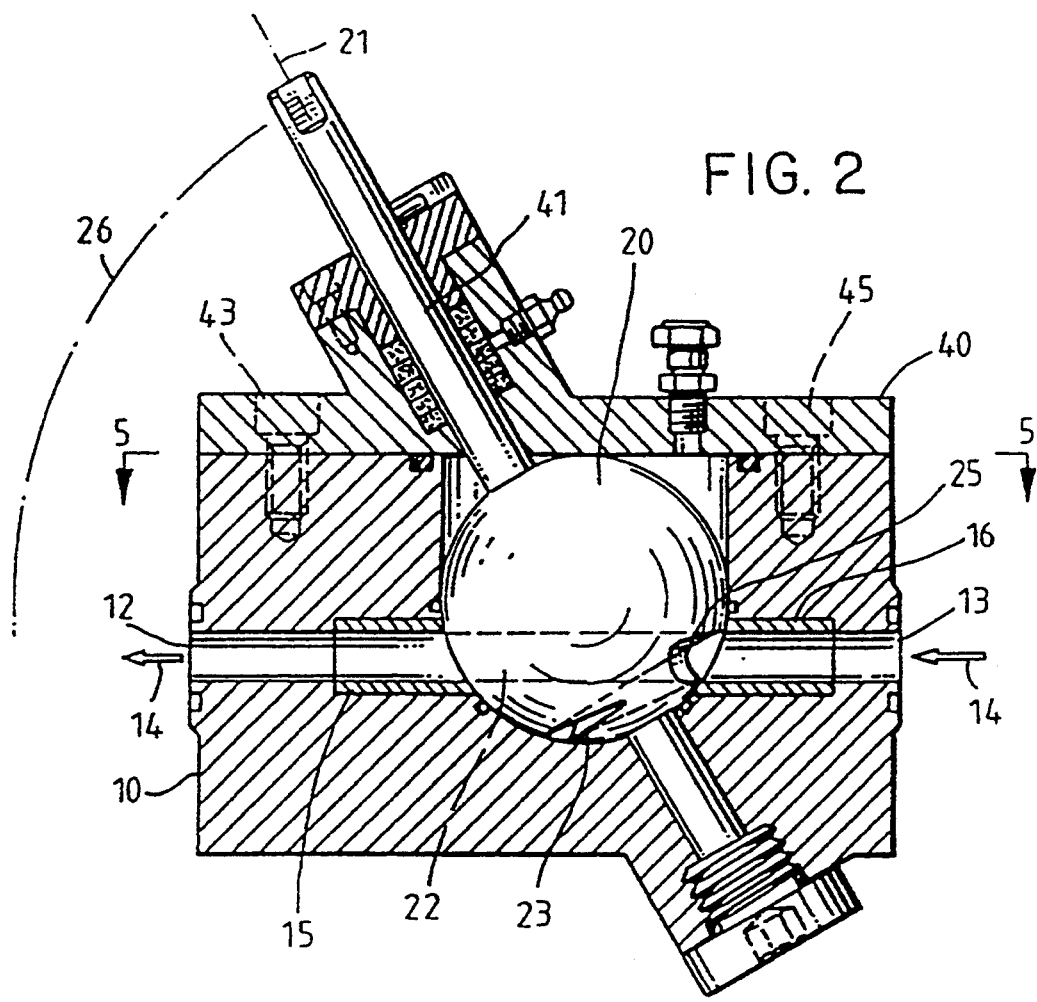
FIG. 2 is a sectional view of the rotary control valve of FIG. 1.
Figure 3:
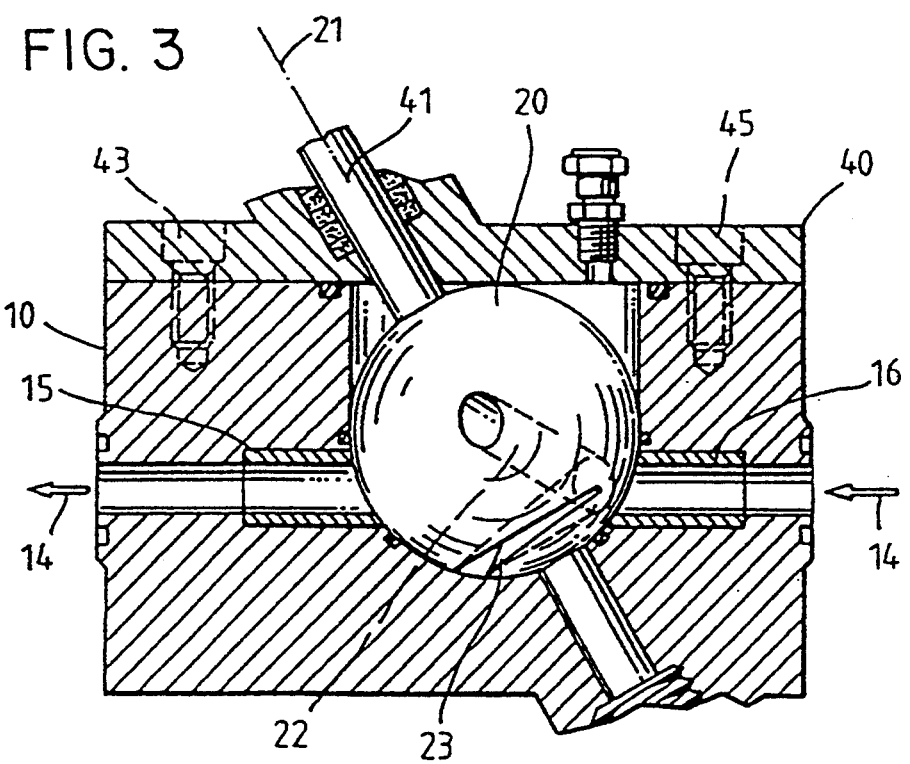
FIG. 3 is the same sectional view of the rotary control valve of FIG. 1 in the fully closed position.

As shown in FIG. 1 through FIG. 5, the preferred embodiment of the valve comprises a main housing 10 which defines a receptacle 11 having a main access. The receptacle 11 also has a pair of flow ports 12 and 13 that define a flow way 14. (See FIG. 2.) A control element body (or control member) 20 is shaped to fit inside the receptacle and has an axis of rotation 21 which is coaxial with the main axis of the housing. The control element body 20 has a through bore 22. The control element through bore 22 will ordinarily have the same inner diameter as the upstream and downstream flow ports 12 and 13. Extending from the upstream outlet of the through bore 22, an elongated variable orifice slot 23 extends circumferentially into the outer wall of the control element. The elongated variable orifice slot 23 is defined by walls converging towards the trailing end of the elongated orifice slot 23. The body of the control member 20 also has a spherical surface area moveable to the adjacent downstream outlet. The spherical surface 24 is adapted to prevent flow through the valve from the upstream port. The receptacle 11 is closed, and the control member 20 is held in place by a bonnet 40, which has a valve bore 41 and fastening means, namely four threaded bolts 42 through 45.

Two circular seals 15 and 16 are typically seated in the main housing 10 to provide a seal between the two flow ports 12 and 13, and the ball sphere surface 24. In addition, the main housing 10 defines a receptacle 17 for a bypass channel housing 30 such that the flow from the upstream port 12 to the variable orifice slot 23 in the control element body 20 would, in the less than fully open position, flow through a bypass channel 31 and exit into the downstream port 13. (See FIG. 3.) The bypass channel 31 may be defined within the bypass housing that fits within the main housing 11. The bypass channel has a tortuous path and baffling means 32 that, with the elongated orifice slot, provide a combined flow control function and a noise suppression function.

In the preferred embodiment, the control element 20 is spherical. It may, however, be any shape that can be rotably mounted, i.e., it would generally have, in a cross-sectional view, a circular shape. For example, a conical plug is also appropriate. The silencing means located within the bypass channel can be a multiplicity of balls, a plurality of ribs, or other such means that can be placed within the bypass channel. (See FIG. 4.) Typically, the upstream outlet of the through bore and the elongated variable orifice slot are placed as close to the equator 25 of the spherical control element as practical. In addition, the control element is seated in the housing with the rotation axis 21 at an acute angle 26 to a line perpendicular to the flow way 14 under control. Such an arrangement maximizes the turn ratio capabilities of the valve. In other embodiments, the upstream outlet of the bore 22 and the elongated variable orifice slot 23 may be constructed latitudinal from any point wholly below or wholly above the equator of the control element to the described preferred position. Compare FIG. 2 to FIG. 3. In such embodiments, the acute angle 26 of the rotational axis of the control element body 20 will change such that the upstream outlet of the bore 22 (in the fully open position) and the elongated orifice slot 23 communicate with the upstream flow-way.

In addition, the whole embodiment may contain a bypass channel housing constructed, in whole or part, of a translucent or transparent material in order to visually monitor the need for maintenance. This same bypass channel housing may also have a separate, normally closed access 33 to the bypass channel for modification to, or maintenance of the bypass channel or the noise suppression means contained therein.

AN ALTERNATE EMBODIMENT FEATURING VARIABLE AREA GROOVES COOPERATIVE WITH A BYPASS CHANNEL

Figure 6:
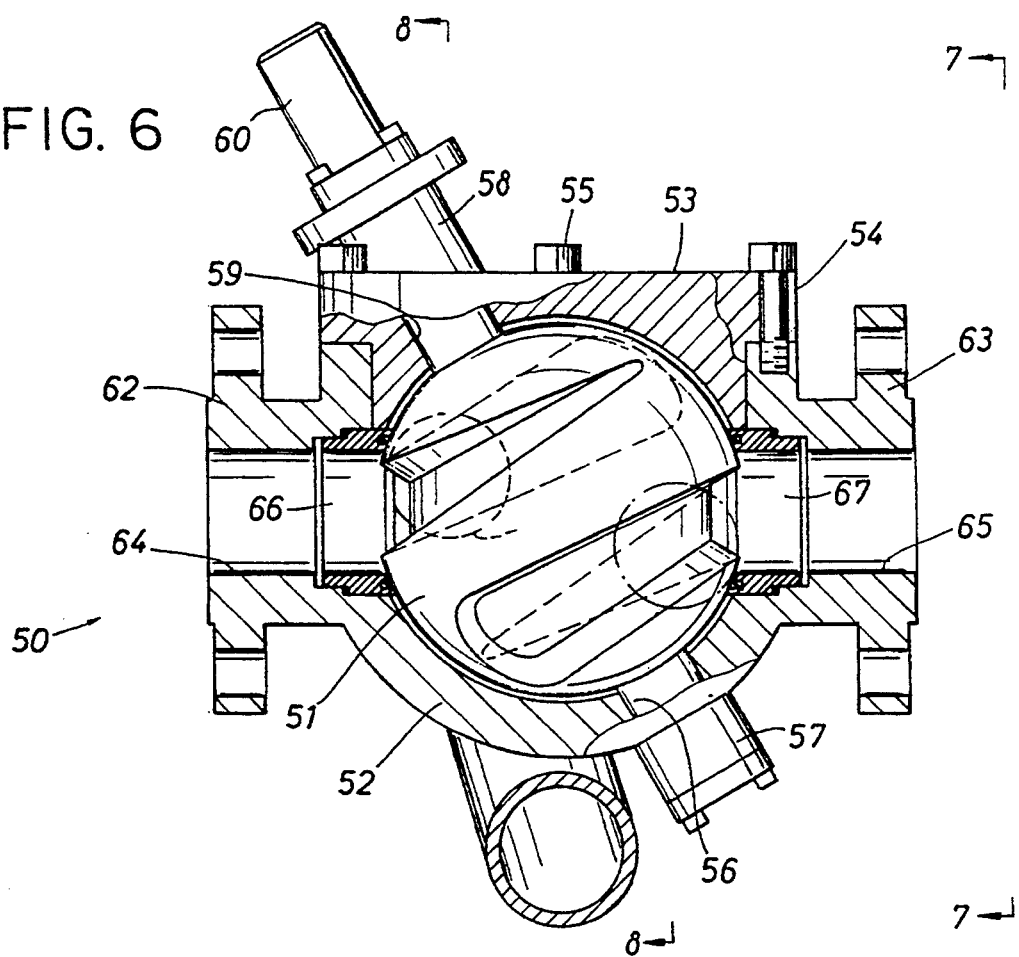
FIG. 6 is a sectional view through a second embodiment of a variable control valve having a bypass passage wherein the controlled valve element is constructed with upper and lower variable area slots cooperative with a bypass channel.

Attention is now directed to FIG. 6 of the drawings where the numeral 50 generally refers to the alternate embodiment which is illustrated in FIGS. 6-9 considered together. In this particular embodiment, a spherical valve element, which is a solid ball, is identified at 51. The ball 51 is captured in a valve housing comprising a surrounding and conforming housing 52. The housing 52 provides a cavity or chamber of conforming spherical shape to receive the ball element which is lifted into and out of the chamber. It should be noted that any member which may be rotably mounted (i.e. a member which, in a cross-sectional view, is a circular shape) would be appropriate. For example, a conical plug would be suitable. The open chamber of spherical shape is closed by a top mounted bonnet 53, which, in the preferred embodiment, comprises a circular flange plate 54 which fastens by suitable bolts 55. When this is in position, it closes the valve body and defines the internal spherical chamber which receives and supports the valve element 51. This is a control valve element which is rotatable because it is mounted on a pair of opposing trunnions, the lower trunnion 56 extending downwardly into a trunnion conforming receptacle 57. As needed, a bearing assembly (not shown) can be received around the trunnion 56 to support the weight of the valve element 51. The trunnion 56 is received in the trunnion receptacle 57 which is located so that the spherical valve element can be lifted upwardly and retrieved without having to remove or disconnect the valve body 52. When the bonnet has been removed, this is possible with ease and convenience of service.

The bonnet is circular as defined by the protruding peripheral flange 54 shown in FIG. 6 of the drawings. It also supports an upstanding trunnion receiving receptacle 58 which is similar to but opposite from the trunnion receptacle 57. The two trunnion receptacles 57 and 58 are aligned with each other to define an axis of rotation for the valve element 51. In this particular embodiment, the axis of rotation is not vertical i.e., it is not at right angles with respect to the flow path which will be described below. Rather, this axis of rotation is at an angle to provide an advantages which will be discussed below.

The trunnion receptacle 58 supports the upstanding trunnion 59 which extends upwardly and through the bonnet. The trunnion receptacle 58 encloses an alignment bearing as needed and also includes appropriate seals (not shown) so leakage does not occur along the trunnion. The trunnion extends to the exterior and there is an external shaft 60 serially connected with the trunnion so that a valve operator mechanism can be attached. In this regard, the valve resembles other control valves that have a protruding shaft which permits an operator to be connected. In this instance, there is a divergence from many common types of ball valve construction in that the valve operator is located at an angle, and is not positioned at right angles with respect to the pipeline which is controlled by the valve 50.

The valve body is constructed with integral upstream and downstream flanges. For purposes of definition, either end can be upstream while the remaining end is then the downstream end. So that clarity of description follows, the left side will be described as the high pressure or upstream end. It is constructed with an industry standard flange and facing plate generally identified at 62. A matching downstream flange and facing plate 63 are likewise provided. These enable construction of a pipeline where the valve 50 is installed at matching flanges in the pipeline. Joinder is accomplished by suitable bolts which fasten the valve assembly 50 in the pipeline.

The upstream flange plate is provided with an axial bore 64 which provides a cross sectional area equal to that of the pipeline. This will be defined as the 100% area. For instance, the valve may have a nominal size of a six inch valve, perhaps a 12 inch valve and some other size. This typically qualifies the valve 50 to be installed in and connected with a pipeline having the same nominal rating. In other words, an 8 inch valve in accordance with the embodiment 50 is nominally connected into and in communication with an eight inch pipeline. These nominal measurements are applied to different sizes of the valve 50 which can be scaled upwardly or downwardly as required. At the upstream end, the bore 64 thus provides the 100% area which is denoted by the nominal size of the valve element.

The upstream end bore 64 is enlarged in a counter bore region to support an insert or seal supporting sleeve 66. The sleeve 66 is equipped with an external shoulder. The external shoulder supports a suitable O-ring so that leakage on the outside of the sleeve 66 is not permitted. The sleeve 66 has an end face or shoulder which conforms with the curvature of the sphere 51. The sleeve is provided with a circular seal ring at that location so that sealing is accomplished between the seal ring and the spherical element 51.

The downstream end of the valve is constructed like the upstream end. In other words, it is constructed with a matching and aligned bore 65 which is provided with the 100% area just mentioned. Likewise, a sleeve 67 is included to support the seals just mentioned for the upstream side. To summarize, the valve 50 is constructed with matching upstream and downstream ports to enable connection in a pipeline having a specified nominal cross sectional area.

Figure 7:
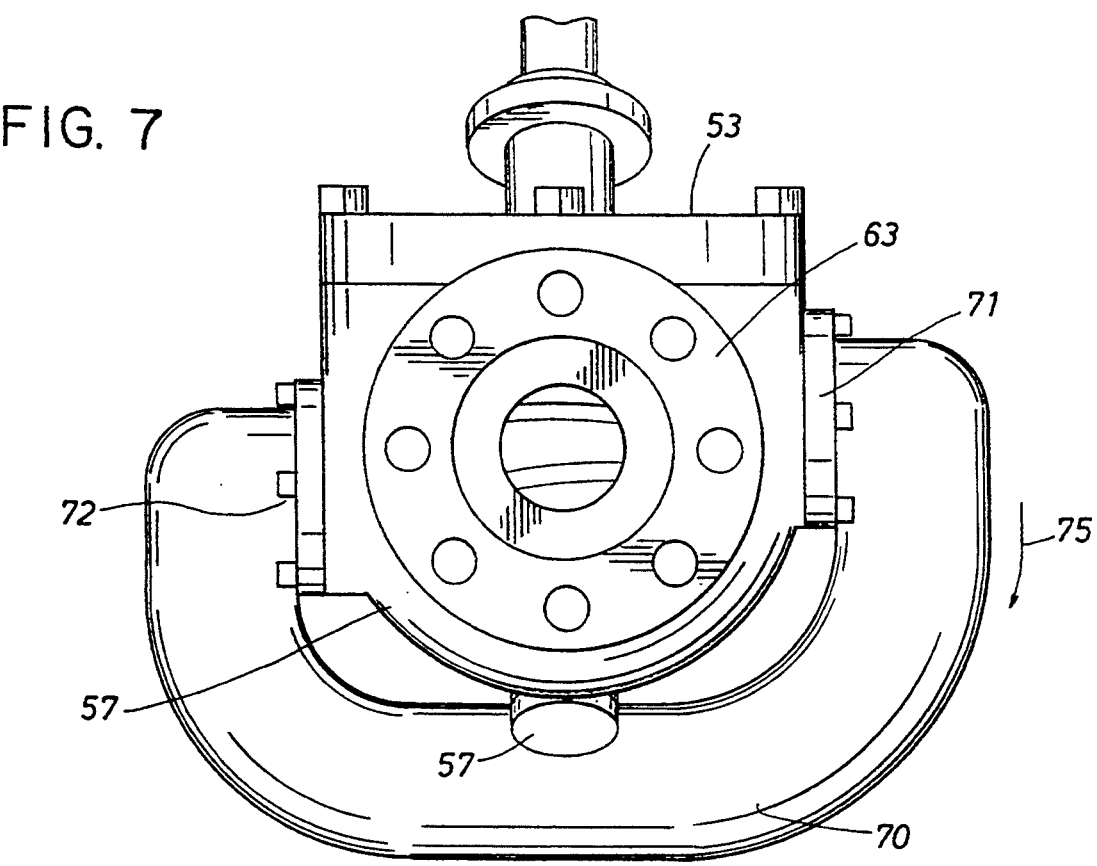
FIG. 7 is a side view of the embodiment of the control valve shown in FIG. 6 wherein the side view is along the line 7—7 of FIG. 6 and further illustrates the bypass around the valve housing.

Flow through the valve 50 is accomplished without an axially drilled passage (or through bore) through the spherical valve element 51. There is no path through the valve element 51. There is none because this particular construction of valve utilizes a bypass around the valve element. Nevertheless, the valve element is included in the control function. This relates in part to the variable area grooves on the valve element which will be described in particular with respect to FIG. 9 of the drawings. For the moment, it is important to note that a bypass is included with (or along the outside of) the valve body 52. Therefore, going now to FIG. 7 of the drawings, the valve body 52 is shown but FIG. 7 is arranged at right angles with respect to FIG. 6. In this particular deployment of the view, the bonnet 53 is illustrated. The flange 63 at the outlet end of the valve is likewise illustrated. The valve body 52 is constructed with inlet and outlet ports for the bypass. Coordinating FIGS. 6 and 7, there are dotted line openings shown in FIG. 6 which relate to the bypass. The bypass is generally indicated at 70 in FIG. 7. Recalling the valve high pressure or inlet end at the left, the left hand side of the valve 50 incorporates the inlet end for the bypass. The inlet end thus includes the slightly elevated end 71 shown in FIG. 7 of the drawings. The slightly lower end 72 is the outlet end of the bypass 70. Going back to FIG. 6 of the drawings, the inlet end is therefore identified at 71 and is somewhat elevated above the outlet end 72. This permits flow from left to right as shown in FIG. 6, while the direction of flow is indicated by the arrow 75 in FIG. 7.

Figure 4:
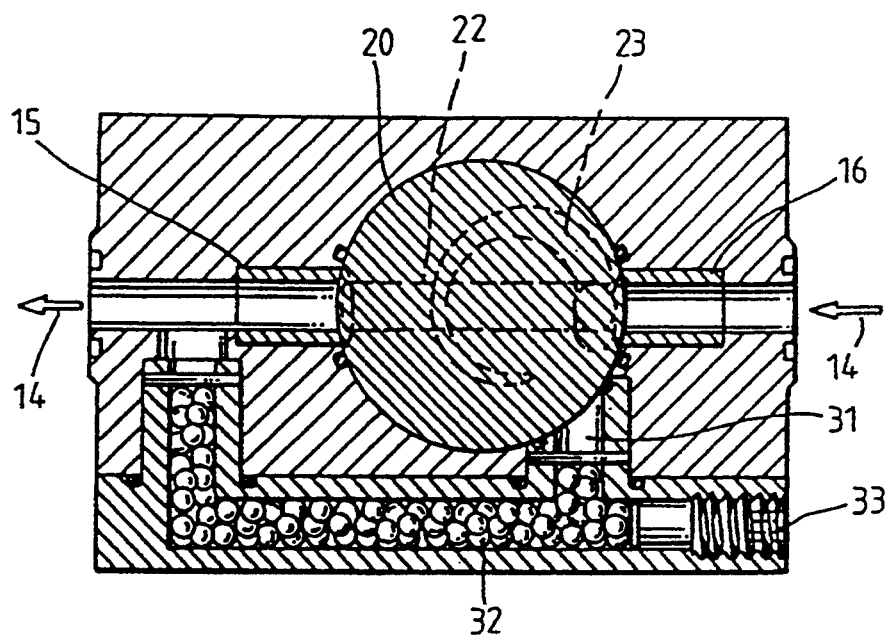
FIG. 4 is a sectional view of the rotary control valve of FIG. 1 in the fully open position.
Figure 5:
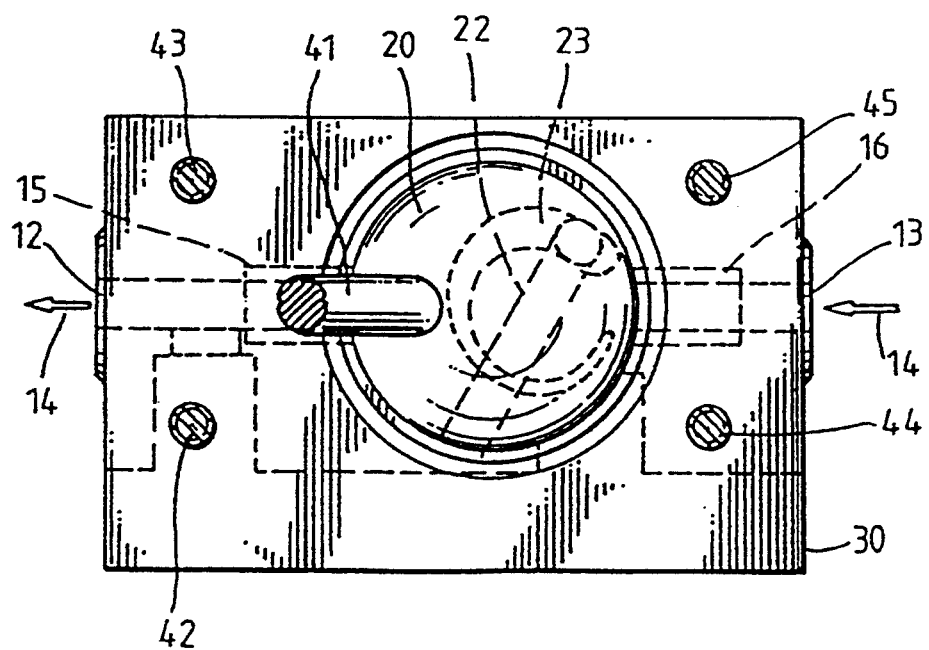
FIG. 5 is a top view of the rotary control valve of FIG. 1 in the fully closed position.

The size of the openings 71 and 72 should be noted. It is desirable that no constriction arise in the bypass conduit. In other words, the openings 71 and 72 should equal the 100% area. If there is a constrictive means in the bypass 70 such as the small pellets, orifice plates, or alignment vanes such as exemplified by the means 32 as shown in FIG. 4 of the drawings above, then, of necessity, the bypass 70 should have an enlarged cross sectional area so that the effective cross sectional area remains 100%, unless some throttling of the flow is desired. The incorporation of an open channel 70 substantially accomplishes 100% area through put so that there is no choking of the flow through the valve. If, however, it is desirable to reduce the flow velocity with suppression of noise and vibration as a result of that velocity reduction, it is necessary then to incorporate vanes, orifice plates, or pellets as mentioned. To accommodate the reduced flow rate through such a constricted area, the cross sectional area of the bypass 70 must then be increased. The extent of increase in relation to the flow restriction mechanism incorporated in the bypass 70 can be related by one of average skill in the art. Suffice it to say, this results in a bypass 70 of larger cross sectional area which is also reflected by increasing cross sectional area of the ends of the bypass at 71 and 72, and that is accomplished by enlarging the ends 71 and 72.

Figure 8:
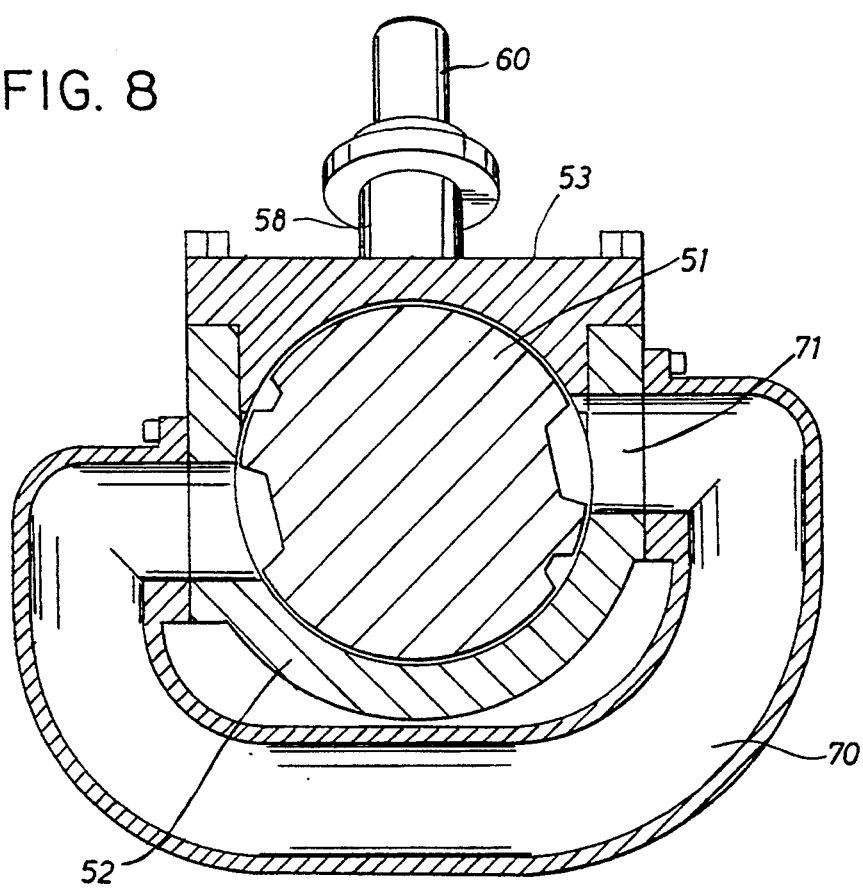
FIG. 8 is a sectional view along the line 8—8 in FIG. 6 of the drawings showing details of construction of the bypass channel and also showing inlet and outlet ports cooperative with the variable area grooves on a spherical valve element.

Attention is now directed to FIG. 8 of the drawings for greater explanation of flow utilizing the embodiment 50. As before, the flow path 70 as indicated. The inlet end 71 is likewise illustrated. Here, the valve element 51 supports a variable area orifice which has the form of a tapered groove. The tapered groove extends partly, and almost fully around the valve element 51. The valve element 51 is a sphere; it sits at an angle which is defined by the trunnions 56 and 59 in FIG. 6 of the drawings. Nevertheless, it does have an equator which defines the sphere into an upper hemisphere and a lower hemisphere. The upper hemispheric region incorporates a groove 80 while the lower hemispheric region incorporates a similar groove 82. Grooves 80 and 82 have common length and hence they inscribe a common angle on the spherical body 51 which supports the two grooves. As will be noted in the drawings, the two grooves are not constructed with common beginning and ending points considering the projection of the spherical surface onto the planar representation in FIG. 9 of the drawings. Looking therefore at the exterior surface of the sphere 51, it will be observed that the grooves taper from a narrow end 83 to a full gauge end 85. This is duplicated in both of the grooves. More importantly, the narrow end enables a constricted flow less than 100% flow. By contrast, the large end of the groove at 85 is sized so that, taking into account the width and depth, the groove provides 100% throughput for the valve 50.

Tracing now a flow path through the valve 50, 100% area is provided at the inlet port 64. This is preserved at the sleeve 66. One hundred percent flow is then directed to the lowermost groove 82, referring to FIG. 6 of the drawings. Here, the flow is diverted from the axial direction of the pipeline. Flow is directed into the channel defined by the groove 82. At the 100% or maximum throughput position, flow is introduced to the large end of the groove 85 and flows around the spherical valve element 51. In theory, flow can travel about 270° around the valve element 51. However, at a position where the flow is 100%, the flow is introduced through the inlet port 64 and is quickly intercepted by the port 71 and is then directed into the bypass 70, note the arrangement of the components in FIG. 8. The numeral 85 again identifies the large end of the groove at the maximum opening position which has been assumed for the description of FIG. 8. This directs fluid flow into the bypass 70 which flow then moves from the right side of FIG. 8 of the drawings to the left side by flowing along the bypass 70 towards the outlet end 72. In this particular instance, the flow is introduced into the second groove 80 which is below the equator as illustrated graphically in FIG. 9 of the drawings. This enables flow to be introduced into the outlet port 65. Flow delivered to the port 65 is directed through the upper most groove 80 and into the outlet port 72 of the bypass 70.

Figure 9:
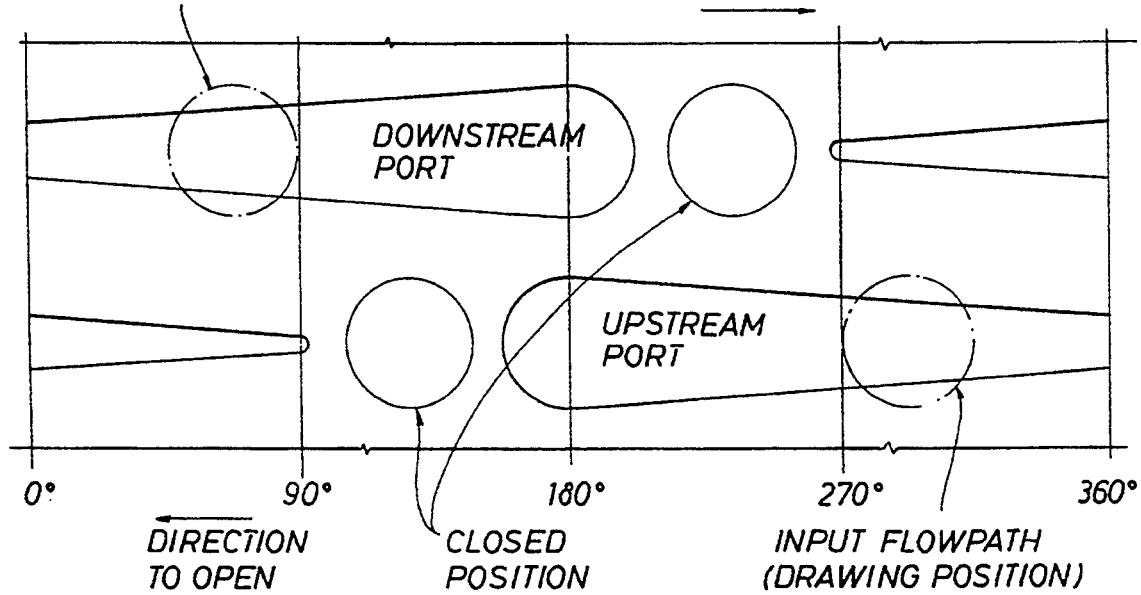
FIG. 9 is a planar presentation of the variable area slot or groove on the exterior surface of the valve element wherein this presentation shows the two variable area grooves and angular deployment of the grooves around the valve element.

At an intermediate position, the valve element is rotated so that the ports 71 and 72 are moved away from the large portions of the respective grooves. An intermediate position is represented in FIG. 9 of the drawings where the bypass ports 71 and 72 are located at intermediate locations. This emphasizes an important feature of the present disclosure. Recall that the large end 85 of the groove 80 represents that area of the groove which is associated with 100% volumetric throughput of the valve 50. The narrow end 83 is associated with the smallest flow permitted by the equipment. The precise locations of the ports 71 and 72 as shown in FIG. 9 of the drawings is associated with some selected intermediate position such as one which provides flow of 60% capacity. The fluid flow, now choked or reduced, is confined or restricted because the flow is directed through both grooves which taper. The restriction is thus found at the reduced cross sectional area of the two grooves 80 and 82. They are matching in the sense that both the inlet and outlet ends of the bypass are restricted. Thus, as the control valve element 51 is moved to the most constricted position, the inlet and outlet ends of the bypass are constricted in precisely the same fashion.

The valve element (or flow control member) 51 is constructed of a sphere which is machined to form the two grooves as described. While the groove 80 is positioned in the upper hemisphere, the groove 82 is formed in the lower hemisphere. The two grooves are shown to be offset from each other in FIG. 9 of the drawings to accommodate the movement of the valve element 51 when installed between inlet and outlet ports. The two grooves are offset therefore to accommodate the connection which is separated by 180° with respect to the ends of the bypass line 70. Taking into account the relative difference of the fixed end locations of the bypass 70, the two grooves have an angular offset so that the two grooves match at all times without regard to angular position of the sphere.

Going back now to FIG. 6 of the drawings, the axis of rotation for the valve element 51 is approximately 26° from the vertical. As viewed at right angles in FIG. 7, the valve element is mounted on the trunnions which are perpendicular to this aspect of the valve body. The construction described to this juncture is a valve which can be installed in a pipeline and permanently fixed in the line by suitable bolt connections. Unbolting the valve body for purposes of services is a tedious task, and also requires some sort of upstream and downstream blocking valves so that service can be carried out. In that instance, the blocking valves are essential because the valve body must be removed for service. In this construction, service can be accomplished simply by blocking flow and then removing the bonnet 53 by unthreading the bolts 55 shown in FIG. 6. This enables removal of the bonnet and then removal of the spherical valve element 51. At that juncture, the seals on the sleeves 66 and 67 can be serviced and replaced. Other service can be provided at that time also.

While the foregoing is directed to the preferred embodiment, the scope is determined by the claims which follow.

I claim:

1. A rotary control valve, comprising
   (a) a main housing defining
      (1) a receptacle having a main axis;

(2) an upstream flow port and a downstream flow port communicating with the receptacle at spaced points to define a flow way therethrough disposed at an angle to the main axis;
(3) a bypass channel having an upstream bypass channel port and a downstream bypass channel port communicating with the receptacle; and
(4) a stem port;
(b) a control valve member rotatably disposed within the receptacle, shaped to fit the receptacle, having an axis of rotation coaxial with the main axis, and defining
(1) an axial through bore having an axis generally at an acute angle with respect to the axis of rotation, and the bore opening through the outer wall of the control valve member, so that the opposite ends of the bore will be in register with the flow ports at a full open position of the flow control member;
(3) an elongated orifice slot in the wall of the control member extending latitudinally around the flow control member and tapering away from the upstream bypass channel port in the main housing, the slot being defined by walls converging toward trailing ends;
(4) a spherical surface on the control valve member adapted to close off the flow ports; and
(5) a stem for rotating the control valve member.

2. The valve as claimed in claim 1 including a silencing means.

3. The valve as claimed in claim 2 wherein the silencing includes a multiplicity of balls.

4. The valve as claimed in claim 2 wherein the silencing means is one or more orifice plates.

5. The valve as claimed in claim 3 wherein a plurality of orifice plates are arranged in increasing order of diameter of the orifice wherein pressure drop is achieved across the valve in stages.

6. The valve as claimed in claim 1 wherein the control valve member is, in cross sectional view, a circle.

7. The valve as claimed in claim 6 wherein the control valve member is a sphere.

8. The valve as claimed in claim 1 wherein the main housing provides entry to the valve such that maintenance may be performed on the valve while in line.

9. The valve as claimed in claim 1 wherein the elongated orifice slot extends past the bore in a manner such that, when the bore is coaxial with the flow port, the extension of the slot is still communicating minimally with the bypass flow way.

10. The valve as claimed in claim 1 wherein the cross sectional void area of the bypass channel is equal to the cross sectional area of the upstream and downstream flow ports of the receptacle.

11. The valve as claimed in claim 1 wherein specially formed seals are seated in the receptacle of the main housing at the upstream flow port and the downstream flow port of the receptacle.

12. The valve as claimed in claim 1 wherein the main housing defines a maintenance port which provides access to the bypass channel.

13. A rotary control valve comprising
(a) a main housing defining
(1) a receptacle having a main axis;
(2) an upstream flow port and a downstream flow port communicating with the receptacle at spaced points to define a flow way therethrough disposed at an angle to the main axis;
(3) upstream and downstream bypass channel ports communicating with the receptacle and the outer surface of the main housing; and
(4) a stem port;
(b) a bypass channel defining
(1) an entrance port and an exit port communicating with the bypass channel ports; and
(2) a flow way;
(c) a control valve member rotatably disposed within the receptacle, shaped to fit the receptacle and having an axis of rotation coaxial with the main axis, the control valve member defining
(1) an upstream elongated orifice slot along the wall of the control valve member, extending around the control member and tapering, from a full open position, away from the upstream bypass channel port in the main housing, the slot being defined by walls converging toward trailing ends;
(2) a downstream elongated orifice slot along the wall of the control valve member, extending around the control member and tapering, from a full open position, away from the downstream bypass channel port in the main housing, the slot being defined by walls converging toward trailing ends; and
(3) a stem for rotating the control valve member.

14. The valve as claimed in claim 13 wherein the elongated orifice slots are positioned on either side of the equator of the control valve member.

15. The valve as claimed in claim 13 wherein the elongated orifice slots are positioned on the control member such that each slot presents the same cross sectional area to its respective flow port.

16. The valve as claimed in claim 13 wherein the maximum cross sectional area of the bypass channel is equal to the cross sectional area of the upstream and downstream flow ports of the receptacle.

17. The valve as claimed in claim 13 wherein the maximum cross sectional void area of the bypass channel is equal to the cross sectional area of the upstream and downstream flow ports of the receptacle.

18. The valve as claimed in claim 13 including a silencing means in the bypass channel.

19. The valve as claimed in claim 18 wherein the silencing means is a multiplicity of balls.

20. The valve as claimed in claim 18 wherein the silencing means is one or more orifice plates.

21. The valve as claimed in claim 18 wherein the only silencing means is the tortuous path of the bypass channel.

22. The valve as claimed in claim 13 wherein the control valve member is, in cross sectional view, a circle.

23. The valve as claimed in claim 22 wherein the control valve member is a sphere.

24. The valve as claimed in claim 22 wherein the control valve member is a conical plug.

25. The valve as claimed in claim 13 wherein the main housing provides an entry to the valve such that maintenance may be performed on the valve while in-line.

26. The valve as claimed in claim 13 wherein the upstream elongated orifice slot extends past the bore in a manner such that, when the bore is coaxial with the flow port, the extension of the slot is still communicating minimally with the bypass channel.

27. The valve as claimed in claim 13 wherein seals are seated in the receptacle of the main housing at the upstream flow port and the downstream flow port of the receptacle.

28. The valve as claimed in claim 13 wherein the bypass channel defines a maintenance port which provides access to the flow way.

* * * * *